United States Patent [19]

Levecque et al.

[11] 4,113,456
[45] Sep. 12, 1978

[54] FIBERIZATION ENERGY CONSERVATION

[75] Inventors: Marcel Levecque, Birchrunville, Pa.; Jean A. Battigelli; Dominique Plantard, both of Rantigny, France

[73] Assignee: Saint-Gobain Industries, Neuilly-sur-Seine, France

[21] Appl. No.: 829,515

[22] Filed: Aug. 31, 1977

Related U.S. Application Data

[63] Continuation-in-part of Ser. No. 780,589, Jan. 24, 1977, Pat. No. 4,070,173, Ser. No. 762,789, Jan. 25, 1977, and Ser. No. 676,755, Apr. 14, 1976, each is a continuation-in-part of Ser. No. 557,282, Mar. 11, 1975, Pat. No. 4,015,964, which is a continuation-in-part of Ser. No. 353,984, Apr. 24, 1973, Pat. No. 3,885,940.

[30] Foreign Application Priority Data

Aug. 23, 1977 [FR] France .............................. 77 25695

[51] Int. Cl.² ............................................. C03B 37/06
[52] U.S. Cl. .............................................. 65/5; 65/16; 264/12; 425/7
[58] Field of Search ................. 65/2, 5, 16, 12; 264/12; 425/7

[56] References Cited

U.S. PATENT DOCUMENTS

| 2,515,738 | 7/1950 | Slayter et al. ........................... 65/16 |
| 2,925,620 | 2/1960 | Karlovitz et al. ......................... 65/5 |
| 3,874,886 | 4/1975 | Levecque et al. ..................... 65/16 X |

Primary Examiner—Robert L. Lindsay, Jr.
Attorney, Agent, or Firm—John T. Synnestvedt

[57] ABSTRACT

Gas blast attenuation of thermoplastic attenuable material is disclosed including the use of a principle current or blast with one or more jets of smaller cross section directed transversely into the blast and creating zones of interaction having whirling currents, especially of the kind developed in toration techniques, the whirling currents including fuel and comburent components in proportions providing a combustible mixture, and a stream of thermoplastic attenuable material at a temperature at least as high as the ignition temperature of said mixture being delivered into each zone of interaction.

14 Claims, 11 Drawing Figures

FIBERIZATION ENERGY CONSERVATION

CROSS REFERENCES

The present application is a Continuation-in-Part of our prior applications Ser. No. 780,589, filed Jan. 24, 1977, now U.S. Pat. No. 4,070,173, Ser. No. 762,789, filed Jan. 25, 1977, and Ser. No. 676,755, filed Apr. 14, 1976, which in turn are Continuations-in-Part of our application Ser. No. 557,282, filed Mar. 11, 1975, and issued as U.S. Pat. No. 4,015,964, which, in its turn, is a Continuation-in-Part of our application Ser. No. 353,984, filed Apr. 24, 1973, and issued as U.S. Pat. No. 3,885,940.

BACKGROUND AND OBJECTS

This invention relates to the formation of fibers from attenuable material and is adapted for use in the formation of fibers from various thermoplastic materials, especially mineral materials such as glass and similar compositions which are rendered molten by heating. Since the equipment or apparatus is especially useful in the attenuation of glass and similar thermoplastic materials, the following description refers to the use of glass by way of illustration.

Certain techniques for utilizing whirling currents or tornadoes for the attenuation of molten glass have been disclosed by us in prior applications above identified, such techniques being identified as toration. For example, U.S. Pat. No. 3,885,940, above identified, and also the companion U.S. Pat. No. 3,874,886, disclose development of pairs of counter-rotating tornadoes by directing a gaseous jet into a larger gaseous blast, thereby creating a zone of interaction including pairs of such tornadoes, and into which zone a stream of molten glass is delivered, with resultant attenuation of the glass stream.

Various different embodiments of equipment for effecting toration are disclosed in various of the applications and patents referred to above, but in all instances a jet or jet flow is caused to penetrate an attenuating blast, the jet being of greater kinetic energy per unit of volume than the blast and having a smaller cross sectional dimension than that of the blast transversely of the blast. In all instances, the stream of attenuable material is introduced into the zone of interaction between the jet and blast either directly under the action of gravity or by initially delivering the stream into the influence of the jet to be carried thereby into the zone of interaction.

In considering the following analysis it is first to be kept in mind that the attenuation of thermoplastic materials such as glass must necessarily take place at an elevated temperature. Thus, the glass is rendered molten by heating, for instance to a temperature above about 1250° C., and for high efficiency the temperature of the attenuating gases in contact with the stream of material and the fiber as it is formed must also be sufficiently high to maintain the glass at an appropriate elevated attenuating temperature.

In certain of the prior applications and patents referred to, for instance in U.S. Pat. No. 3,885,940 both the blast and jet are disclosed as having relatively high temperature, for instance a temperature of the order of 800° C. for the jet and 1580° C. for the blast. Although our prior application Ser. No. 780,589 discloses a method comtemplating the employment of low jet temperatures, for instance a jet temperature of the order of ambient or room temperature, prior application Ser. No. 780,589 discloses blast temperatures at relatively high values such as those referred to above.

The technique of the present invention is in striking contrast to those referred to just above in that the present invention makes possible the use of lower temperatures not only for the jet (as in prior application Ser. No. 780,589), but also for the blast. As the blast embodies relatively large volumes of gas, only a portion of which is actively utilized for the attenuation of each fiber being made, the heating of the entire volume of the blast flow to relatively high temperatures results in substantial heat or energy loss.

The foregoing loss of energy in the known techniques for toration of thermoplastic materials is avoided by the technique of the present invention, according to which provision is made for localized combustion of fuel in the immediate vicinity of the attenuating fiber in the zone of interaction between the jet and blast, so that the desired attenuating temperature may be established and maintained without the necessity for heating the total volume of the blast. In this way the temperature of the gases delivered from the blast generator may be greatly reduced with consequent extensive energy saving.

This technique of the present invention, which may be referred to as "energy localization" not only achieves the desired energy conservation, but in addition this technique affords additional advantages. For example, the technique of the invention provides for rapid cooling of the fibers after attenuation, and with many thermoplastic materials such rapid cooling increases the strength characteristics of the fibers formed. This also maximizes fiber length, which is desirable for most purposes.

Still other advantages are achieved by the technique of the invention, as will appear more fully hereinafter, following description of various of the embodiments of equipment useable according to the technique of the invention.

With the foregoing in mind, attention is directed to the following description of equipment employed according to the invention, as illustrated in the accompanying drawings.

BRIEF DESCRIPTION OF THE DRAWINGS

FIG. 6 is a plan view of several adjacent jets and of portions of the blast employed in the arrangement of FIGS. 4 and 5, but omitting the blast feed and the glass fibers being formed;

FIG. 8 is an elevational view, partly in vertical section, and illustrating the adaptation of features of the present invention to a fiberizing system of the general kind shown in FIG. 11 of our U.S. Pat. No. 3,885,940 above referred to;

DETAILED DESCRIPTION

Figure 1:
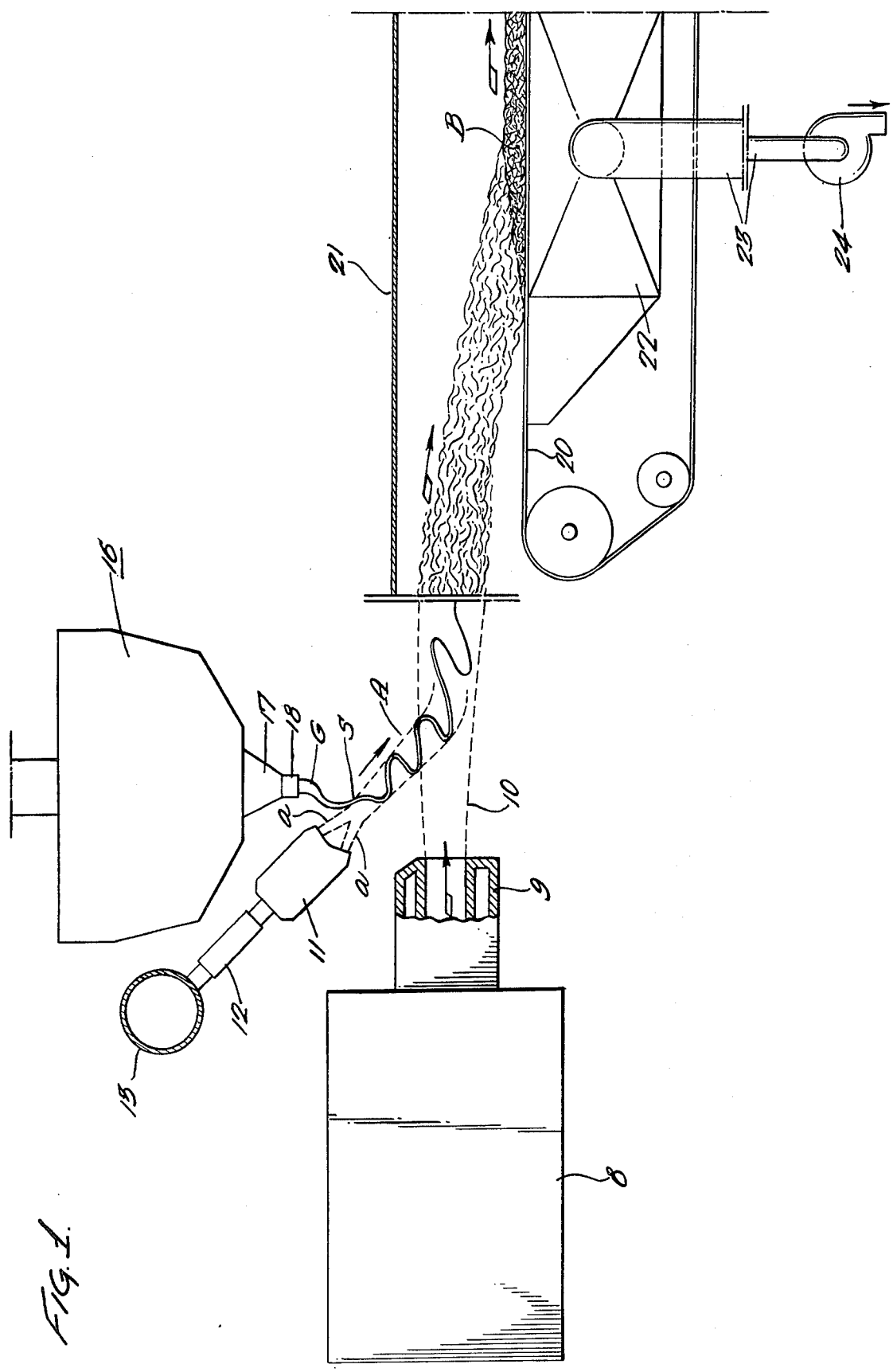
FIG. 1 is a somewhat diagrammatic elevational view of the major fiber producing and fiber collecting components of one system useable according to the invention, in which a pair of jets are employed at each fiberizing center, certain parts being shown in vertical section.

In the following description reference is first made to the structural arrangement shown in the drawings, and thereafter the energy localization aspects of the operation of the equipment according to the technique of the invention will be analyzed.

Referring first to FIG. 1, a blast generator or burner is indicated in outline at 8, the generator having a delivery device 9 from which a blast 10 is discharged. In the embodiment illustrated this discharge occurs in a generally horizontal direction, but it is to be understood that the discharge may be directed in other directions.

Figure 2:
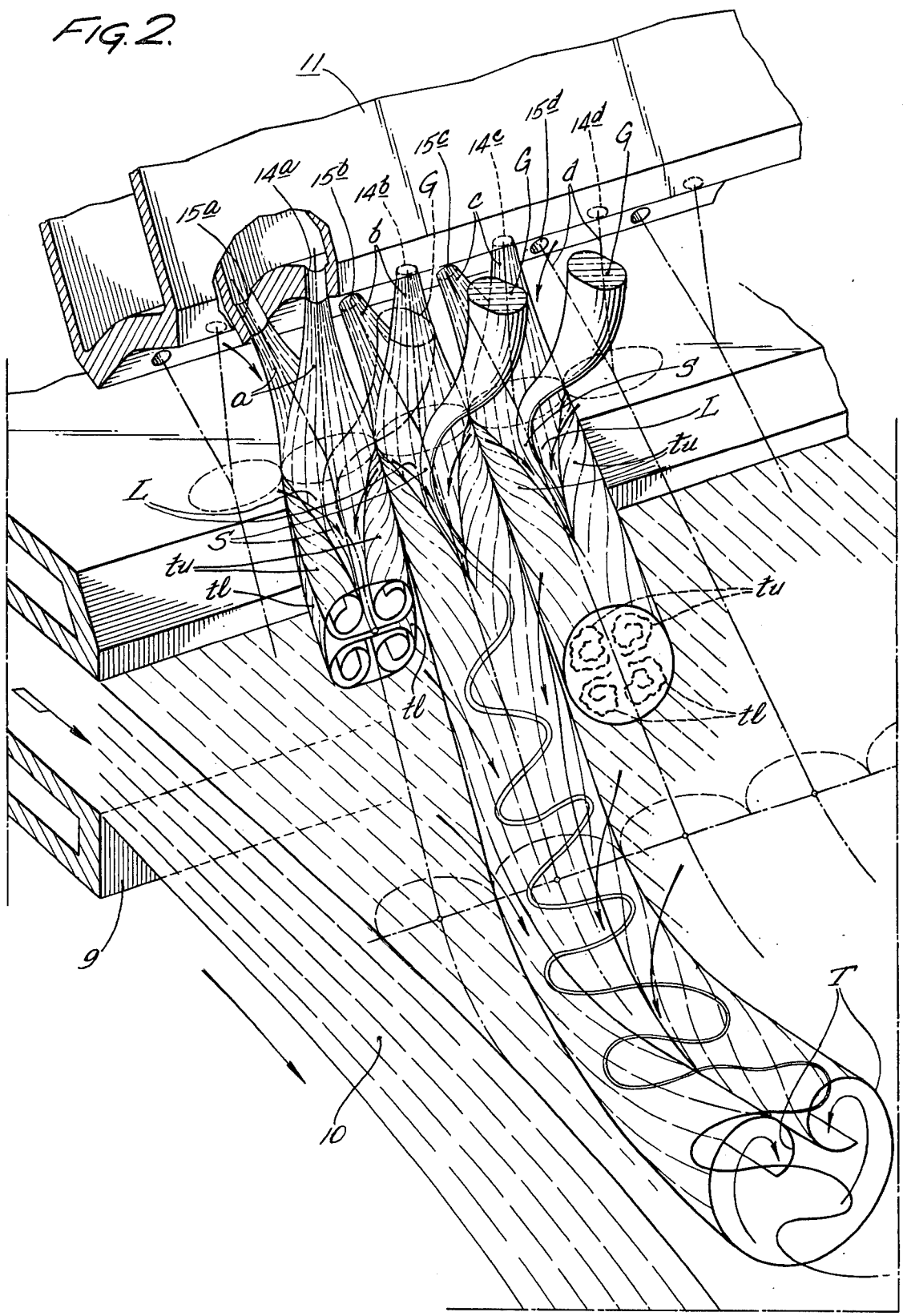
FIG. 2 is an enlarged perspective diagrammatic view illustrating the fiberizing action of the equipment shown in FIG. 1.
Figure 3:
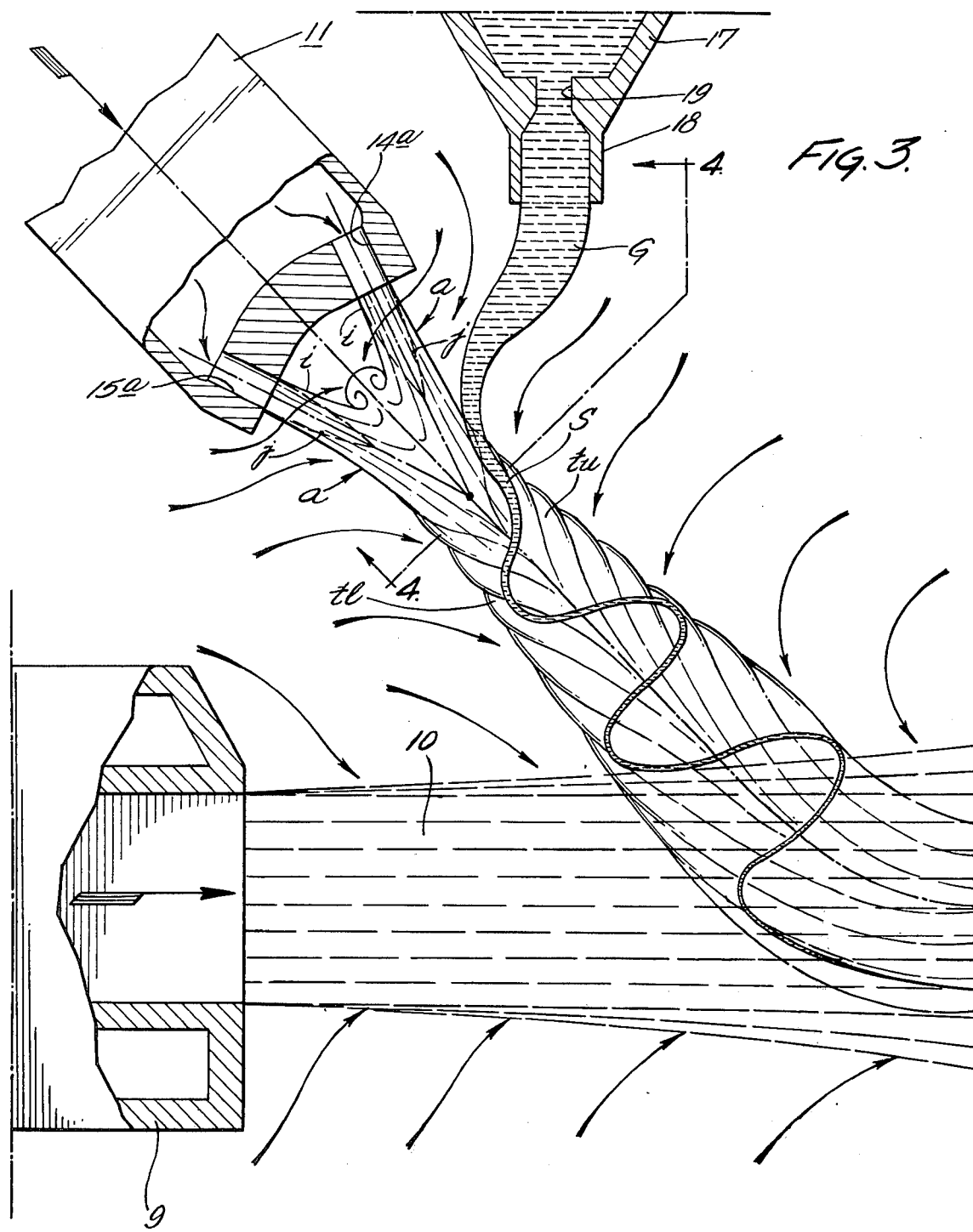
FIG. 3 is an enlarged vertical sectional view through the components of one fiberizing center in the plane of the jet orifices.

A manifold 11 for compressed gaseous medium is supplied with gas from a supply pipe 13 through a connection 12. As best seen in FIGS. 2 and 3 the manifold 11 is provided with pairs of jet orifices 14 and 15, the series of such pairs of orifices being indicated in FIG. 2 by the numerals 14a-15a, 14b-15b, 14c-15c, 14d-15d, and 14e-15e. The jets delivered from each of the pairs of orifices are indicated by the corresponding letters above, and in this connection it is noted that while three pairs of jets appear in the perspective view of FIG. 2, only a single pair of jets (a—a) appears in FIGS. 1 and 3.

As generally represented in FIG. 1 the pair of jets at each fiberizing center, for instance jets a—a impinge upon each other in their common plane and produce a combined carrier jet flow indicated at A in FIG. 1, in which a stream of attenuable material is subjected to a preliminary stage of attenuation. The combined jet flow proceeds downwardly and penetrates the blast 10 creating a zone of interaction between the jet and the blast characterized by whirling currents and which is utilized for a second stage of attenuation.

In the arrangement as shown in FIGS. 1 and 3 a glass supply means is generally indicated at 16, this means having a bushing 17, and the bushing having a series of spaced glass discharge devices 18 each fed from a metering orifice 19. Glass bulbs or cones G are delivered from the devices 18, and from the bulbs, streams of glass S are delivered in a downward direction, one such bulb and stream being included at each of the fiberizing centers.

The fibers formed from a series of fiberizing centers spaced transversely of the blast 10 are deposited upon a foraminous conveyor or belt 20 in the form of a fiber blanket B, as appears in FIG. 1. This fiber laydown occurs within a chamber defined, for example, by wall structure such as indicated at 21. Suction boxes are desirably provided below the conveyor 20, as indicated at 22, the boxes being connected by ducts 23 with one or more suction fans such as diagrammatically indicated at 24.

The attenuating action effected by the equipment as described above can best be explained and analyzed by reference to FIGS. 2 and 3.

The action at each fiberizing center is preferably related to the action of the jets or the jet flow in adjoining fiberizing centers. In FIG. 2, the illustration represents the complete action at the fiberizing center corresponding to jets b—b, but represents only a portion of the action occuring at the fiberizing centers of jets a—a and c—c. In FIG. 3 the action at the fiberizing center represented by jets a—a is shown on an enlarged scale, and in analyzing the operation, attention is first directed to the fact that immediately following the delivery of any gaseous jet from an orifice, the jet induces ambient gas or air. Thus, as shown in FIG. 3, each of the jets a comprises a central jet core indicated by the letter j and a surrounding envelope of gases including induced air indicated by the letter i. This envelope rapidly expands as the jet flow proceeds, and as shown in FIG. 3 the jet core remains as a relatively short cone shaped central portion. Such a core has the velocity of the jet as delivered from the orifice, but the surrounding envelope of induced air is of diminished velocity as the jet flow proceeds. In both FIGS. 2 and 3 numerous arrows have been applied indicating the induction of air by the jet flow, and, in FIG. 3 also by the blast flow.

When employing a pair of jets of substantially the same kinetic energy and preferably also of substantially the same size, with the two jets having axes lying in a common plane and converging toward each other so that the jets impinge upon each other preferably at an acute angle, the combined flow of the jets downstream of the region of impingement is caused to spread laterally, i.e., is caused to spread in directions transverse to the common plane of the axes of the two jets. The pairs of jets or the planes of the axes thereof are positioned sufficiently close to each other so that the lateral spreading of the combined flow is obstructed by virtue of impingement of the combined flow of one pair of jets upon the laterally spreading combined flow of the adjoining pairs of jets. This impingement of the combined flow of adjoining pairs of jets develops two pairs of miniature tornadoes in each jet flow, with the points of origin or apices of the tornadoes of each pair being positioned in spaced relation toward opposite sides of the common plane of the axes of the jets. When viewed as in FIGS. 2 and 3, the upper pair of these miniature tornadoes, indicated at tu—tu, have whirling currents circulating or turning in directions toward each other at the upper side of the tornadoes and away from each other at the lower side. On the other hand, the lower pair of tornadoes indicated by letters tl turn in the opposite directions, as is indicated.

Between the two pairs of tornadoes in the region of impingement of the jets upon each other, a zone L of laminar flow associated with the tornadoes is developed, this zone having high intensity in-flow of induced air, and it is into this laminar flow zone at the side of the upper pair of tornadoes that the stream of glass is introduced. As clearly appears in FIGS. 2 and 3, the stream S of the glass is developed from the glass bulb, which bulb or cone is located in a position horizontally offset from the jet delivery device. However, because the glass of the bulb G is in attenuable or flowable condition as released from the delivery device, the stream S of the attenuable glass is deflected from the horizontally offset position of the bulb toward the laminar flow zone L, this deflection occurring as a result of the intense inflow of induced air, and this effect assures entrance of the stream of attenuable material into the laminar zone. Indeed, even with some misalignment of the glass delivery device 18 with respect to the pairs of jets, the inflow of induced air will automatically compensate for such misalignment and bring the glass stream into proper position.

From the above, it will be seen that by developing the pairs of tornadoes with the intervening zone of laminar flow at each fiberizing center, and by delivering the attenuable material in attenuable condition into the region near said zone, the induced air automatically carries the stream of attenuable material into the zone of laminar flow and automatically compensates for misalignment, thereby providing a highly stable introduction of the attenuable material into the system.

The arrangement as described above and the action of the induced air currents provides for stable introduction of the attenuable material into the system, even where the glass delivery devices are appreciably spaced away from the jet delivery devices, which is desirable in order to facilitate maintenance of appropriate temperature control for both the glass delivery devices and the jet delivery devices.

As seen in FIG. 2, the pairs of tornadoes $tu$ and $tl$ tend to merge downstream of the laminar zone L, and as the flow progresses downstream the tornadoes tend to lose their indentity, as is indicated (toward the right of FIG. 2) by the sectional showing of the two pairs of tornadoes originating with the jets $c$—$c$. The merged jet flow of each pair of jets then proceeds downward to penetrate the blast 10 as is indicated in FIG. 2 for the jet flow originating with the pair of jets $b$—$b$, and within the flow of the blast, the jet develops the zone of interaction characterized by an additional pair of tornadoes indicated at T, this interaction being identified as toration and fully explained in the U.S. Pats. Nos. 3,874,886 and 3,885,940 identified above.

Also as shown in FIGS. 2 and 3, each stream S of glass is subjected to a preliminary attenuation in the jet flow between the zone of laminar flow or point of introduction of the glass, and the point of penetration of the jet into the blast, and the partially attenuated stream is subjected to further attenuation in the zone of interaction of the jet flow with the blast. As indicated in the drawings, these two stages of attenuation are effected without fragmentation of the glass stream, so that each stream produces a single fiber.

The action of the jets at each fiberizing center, particularly in the development of the pairs of tornadoes with the intervening zone of laminar flow, is achieved by employment of pairs of jets which are preferably of substantially the same kinetic energy per unit of volume; preferably also, the jets of each pair are of approximately the same cross sectional area, but some leeway is permissible with respect to the relation between the cross sectional areas of the two jets of a pair, particularly if the kinetic energy per unit of volume of each jet is substantially the same.

Moreover, the jets need not necessarily have exactly the same cross sectional dimensions in directions transverse to and parallel to the common plane of the axes of the two jets. However, it is preferred that the cross sectional dimensions should be substantially the same; and further, that the dimensions of the jets of adjoining pairs should be substantially the same, in order to provide uniformity in the development of the pairs of tornadoes with the intervening zones of laminar flow, as the laterally spreading combined jet flow of each pair of jets impinges upon the combined jet flow of adjoining pairs of jets. Uniformity of the jets at each fiberizing station also provides uniformity in the merging of the tornadoes of the jet flow at each fiberizing center, and this in turn provides uniformity of fiberizing conditions in the toration zones created by the penetration of the jets into the blast.

For purposes of penetration of the jet flow into the blast, when the jet flow reaches the blast it should have higher kinetic energy per unit of volume, than the blast.

It is also to be noted that for the purpose of establishing the zone of laminar flow, into which the stream of glass may be introduced without fragmentation, it is important that the jets be established so that their axes are directed substantially in a common plane and impinge upon each other in said plane, preferably at an acute angle.

In a system such as described above in relation fo FIGS. 1, 2 and 3, the energy localization features of the present invention may be utilized in any of several different ways, but it is first to be kept in mind that according to the present invention it is contemplated that the gas currents in the zone of interaction, i.e. in the toration zone, formed by penetration of the jet flow into the blast, shall include fuel and comburent components in proportions providing a combustible mixture. Preferably the fuel and comburent components in the immediate vicinity of the attenuable material should be present in approximately stoichiometric proportions. The manner in which these components are introduced into the zone of interaction will be explained more fully hereinafter following the structural description of the other embodiments of the equipment illustrated in the drawings.

Figure 4:
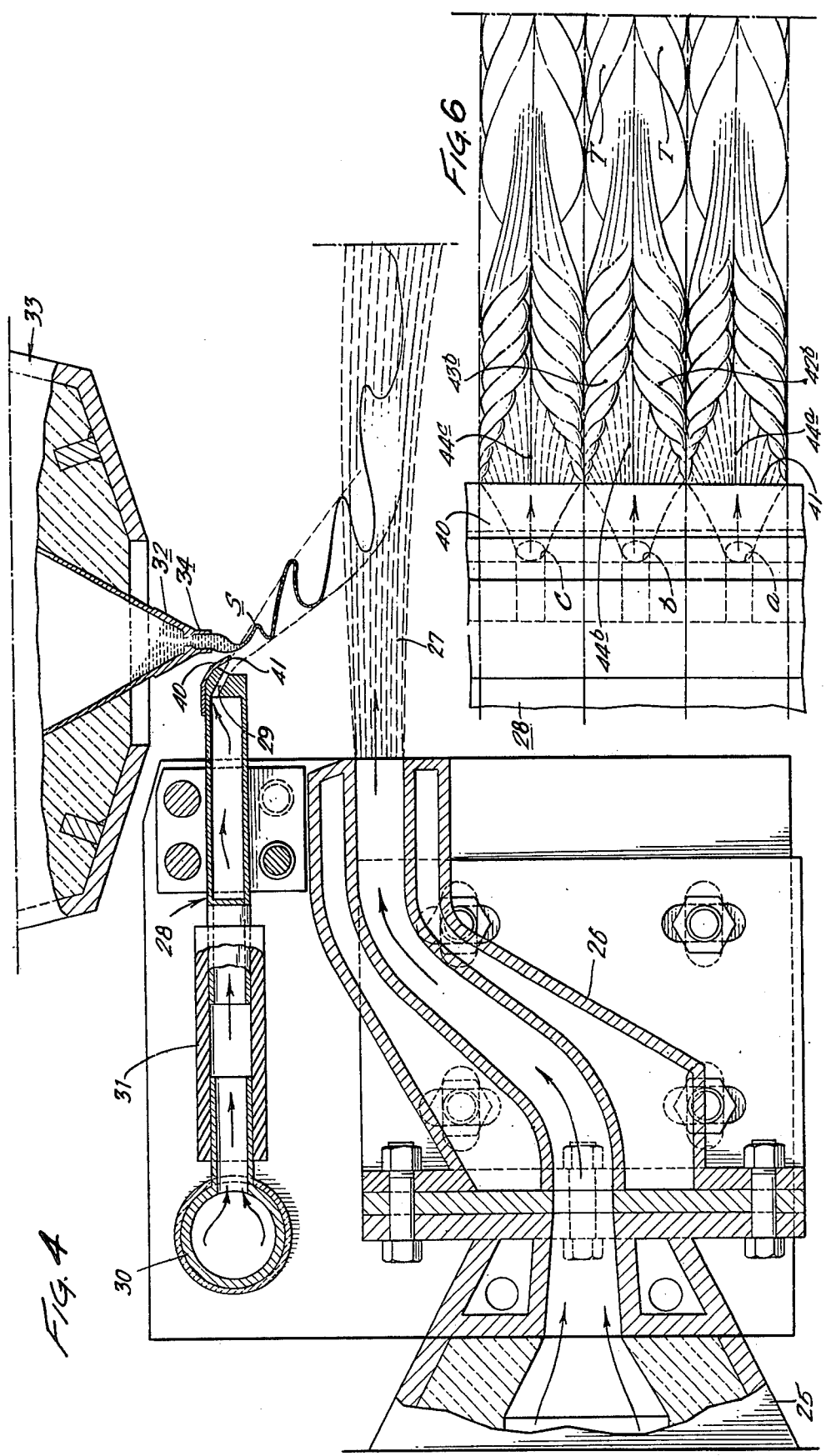
FIG. 4 is a vertical sectional view of the components of a fiberizing center according to another embodiment of equipment useable according to the present invention, this embodiment also being disclosed in copending application Ser. No. 762,789 above identified.
Figure 5:
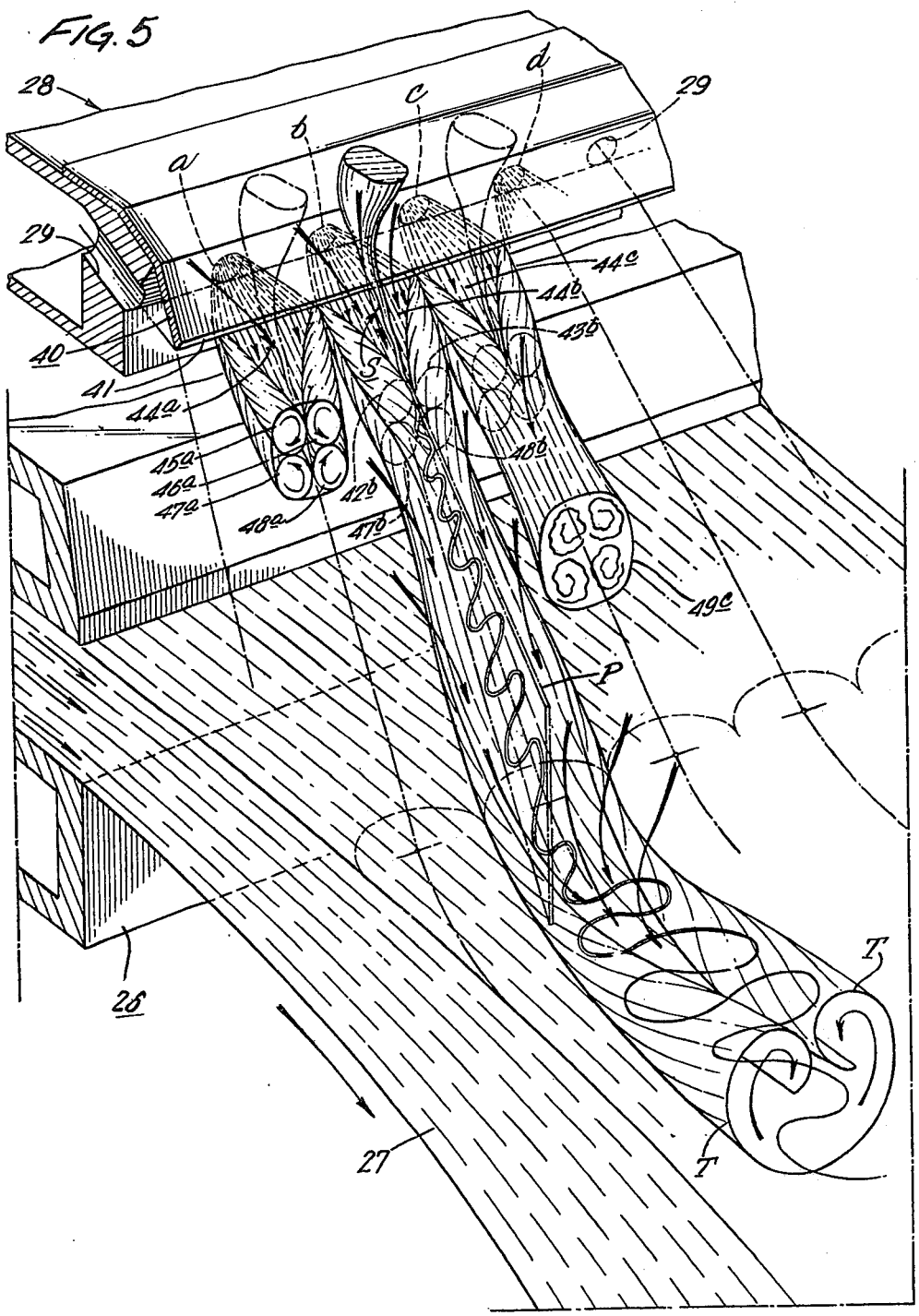
FIG. 5 is a perspective diagrammatic view illustrating the operation of the equipment shown in FIG. 4.

Turning now to the arrangement illustrated in FIGS. 4, 5 and 6, as above noted, this embodiment of the equipment is also disclosed in our prior application Ser. No. 762,789.

In this embodiment a series of secondary or carrier jets are provided and a deflector for the jets is associated with the series, the deflected jets being directed into paths penetrating the blast, the streams of glass being introduced into the jet flow and being delivered by the jets into the zones of interaction into the blast.

In connection with the embodiment of the equipment shown in FIGS. 4, 5 and 6 reference is first made to FIG. 4 which shows the principle components of a fiberizing center.

Toward the left in FIG. 4 there is shown a blast generator 25 having a nozzle structure 26 from which the blast 27 is delivered.

A jet manifold box is indicated at 28, this manifold having a series of jet orifices 29 through which are delivered a series of jets (indicated in FIG. 5 by the letters $a$, $b$, $c$ and $d$). The jet manifold 20 may be supplied with pressurized jet fluid from the supply line 30 through the connection 31. The jet manifold 28 serves to mount a deflector strip 40 overlying the series of jets and having its free edge 41 positioned so that the jets impinge upon the deflector.

A bushing 32 associated with a forehearth or other appropriate glass supply means indicated at 33 is provided with glass orifice means indicated at 34, and the stream of glass S is delivered into the flow of the jet to be described hereinafter and is carried downwardly to the zone of interaction in the blast 27. As will be explained, fiberization occurs in the jet and also in the blast, and as the blast delivers the fibers toward the right as viewed in FIG. 4, a fiber blanket is laid down upon a perforated traveling conveyor or belt of the kind described above with reference to FIG. 1.

As seen particularly in FIG. 5, the blast nozzle 26 is of substantial width. The bushing 33 for the supply of glass preferably also has substantial dimension in the direction perpendicular to the plane of FIG. 4 in order to provide for the supply of glass to a multiplicity of the glass delivery devices 34.

It is contemplated that the jets delivered from the jet orifices 29 be subjected to the guiding section of certain elements or devices which cooperate with the jets in generating pairs of counter-rotating whirls or tornadoes which are utilized for at least the preliminary attenuation of the streams of attenuable material and also for purposes of feed of the partially attenuated filaments into the zone of interaction provided by penetration of the jets into the blast, i.e. into the toration zones. For the purpose of developing the counter-rotating pairs of tornadoes, the deflector plate 40 is associated with a group of the jet orifices. As seen particularly in FIG. 5, the guide or deflector plate is desirably formed as a bent plate, one portion of which overlies and is secured to the jet manifold box and the other portion of which has a free edge 41 lying in a position in the path of flow of the jets delivered from the jet orifices 29, advantageously along a line intersecting the axes of the jet orifices.

As is graphically illustrated, particularly in FIG. 5, this position of the deflector plate 40 and its edge 41 results in impingement of each of the jets upon the underside of the plate 40 with consequent spreading of the jets. Thus, in FIG. 5, the flow of four of the jets originating from orifices *a, b, c* and *d* is shown, and it will be seen that as the edge 41 of the plate is approached, each of the jets spreads laterally.

It is contemplated according to the invention that the jet orifices 29 be placed sufficiently close to each other and also that the deflector or guiding means be arranged so that upon lateral spreading, the adjacent or adjoining jets will impinge upon each other in the region of the edge 41 of the deflector plate. Preferably, the adjacent jets impinge upon each other at or close to the free edge 41 of the guide plate 40 as is shown in FIG. 5. This results in the generation of pairs of counter-rotating whirls or tornadoes which are indicated in FIG. 5 in association with each of the three jets delivered from the orifices *a, b* and *c.*

In analyzing the formation of these tornadoes, particular reference is made to those associated with the jet originating from orifice *b* in FIG. 5. Thus, it will be seen that tornadoes 42*b* and 43*b*, are generated and that these two tornadoes have their apices originating substantially at the edge 41 of the deflector 40 at opposite sides of the jet at the zone in which the spreading jet impinges upon the adjacent spreading jets delivered from orifices *a* and *c*. The tornadoes 42*b* and 43*b* are oppositely rotating and the tornadoes enlarge as they progress, until they meet at a point spaced downstream from the edge 41 of the deflector. These tornadoes 42*b* and 43*b* also have currents in the downstream direction, as will be seen.

Because of the spacing of the apices or points of generation of the tornadoes 42*b* and 43*b* and because of the progressive enlargement of those tornadoes, a generally triangular zone 44*b* intervenes between the tornadoes and the edge 41 of the deflector plate, and this triangular zone is of relatively low pressure and is subjected to intensive inflow of induced air, but the flow in this zone is substantially laminar. This is the zone into which the stream of molten glass or other attenuable material is introduced into the system, and because of the character of this triangular laminar zone the stream of glass is not fragmented but is advanced as a single attenuating system into the region between the pair of tornadoes.

Attention is now called to the fact that the directions of rotation of the currents in the tornadoes 42*b* and 43*b* are opposite, being clockwise for tornado 42*b* and counter clockwise for tornado 43*b* as viewed in FIG. 5. Thus, the currents in these two tornadoes approach each other at the upper side thereof and then flow downwardly toward the central or laminar zone 44*b*.

The directions of rotation just referred to are further indicated by arrows for the tornadoes 45*a* and 46*a* in connection with the corresponding pair of tornadoes associated with the jet delivered from the orifice *a*. It will be understood that in the illustration of the jet flow originating from orifice *a*, the flow has been shown as cut off or sectioned adjacent to the downstream end of the zone of laminar flow 44*a*, i.e. adjacent to the zone in which the pair of tornadoes have been enlarged and commence the mutual merging which occurs as the jet flow proceeds. With the illustration just referred to, it further clearly appears that the jet flow originating from orifice *a* not only includes the pair of tornadoes 45*a* and 46*a* but also includes another pair of tornadoes 47*a* and 48*a*, the directions of rotation of which are also opposite to each other, as shown in FIG. 5, but in this case, the tornado 47*a* at the left, as viewed in FIG. 5, rotates in a counter clockwise direction, whereas the tornado 48*a* at the right rotates in the clockwise direction. It will be understood that similar duplicate pairs of tornadoes are generated by and associated with each of the jets.

Still referring to FIG. 5, as the flow proceeds from the plane in which the tornadoes are illustrated for the jet delivered from orifice *a*, all four of the tornadoes tend to merge and reform a more generalized jet flow and this is indicated in FIG. 5 by a section 49*c*, representing a downstream section of the jet flow originating from orifice *c*. As will be seen, the whirling motions of the tornadoes are diminishing in intensity and the entire flow, including the laminar flow of the central zone of the jet, intermix with each other in the region indicated at 49*c*, and thereafter the jet progresses downwardly toward the blast which is indicated at 27 in FIG. 5 and referred to more fully hereinafter.

In the illustration of FIG. 5 it will be understood that for the sake of clarity, the showing of the various portions of the jet flow is somewhat schematic. For instance, in a zone spaced somewhat downstream of the points of origin, the pairs of tornadoes originating in one jet appear in the Figure as being somewhat separated from the pair of tornadoes originating in adjoining jets, whereas, in fact, the tornadoes of adjoining jets would be substantially contiguous.

Because of the jet flow in the laminar zone and in the pairs of tornadoes, particularly the upper pair of each group, the introduction of the stream of attenuable material, which is indicated in FIG. 5 at S for the fiberizing center including the jet orifice b, results in the progression of the stream into the laminar flow of the central zone. This carries the stream into the zone of high velocity lying between the pairs of tornadoes and, in consequence, the stream is attenuated as is shown in FIG. 5. It is found that this attenuation occurs substantially within a planar zone indicated in FIG. 5 at P. The action of the pairs of tornadoes causes a whipping of the attenuated fiber substantially within the planar zone P, so that this attenuation does not result in projection of the fibers being formed laterally toward the adjoining jets.

Further jet flow causes the jet, together with the attenuating fiber carried thereby, to penetrate the upper boundary of the blast 27, the jet flow still retaining sufficient kinetic energy to effect such penetration of the blast, and thereby initiate a second phase of fiberization which proceeds or is effected, in accordance with the principles fully explained in the prior applications and patents referred to above. Indeed, in the region of penetration of the jets into the blast, the flow and velocity of each jet is still sufficiently concentrated near the center of each jet so that each jet acts individually to develop a zone of interaction in the blast. Thus, from FIG. 5 it will be noted that in the zone of interaction, i.e. in the toration zone, a pair of oppositely rotating whirls or tornadoes indicated at TT, are generated, thereby developing the currents which cause further attenuation of the fiber being formed. The fiber is thereafter carried by the combined flow of the jet and blast to a suitable collection means, for instance a travelling perforated conveyor such as indicated diagrammatically at 20 in FIG. 1.

As will be understood, both in the laminar zone adjacent to the edge of the deflector and also as the jet flow progresses downstream, air is induced, and this induction of air is clearly indicated by arrows applied to the jet flow in FIG. 5.

Having in mind the foregoing description of the general nature of the equipment and operation contemplated according to the present invention, attention is now called to certain permissible variations and ranges of operating conditions which may be employed.

As with the first embodiment of the equipment described above, the fuel and comburent components may be introduced into the system of FIGS. 4, 5 and 6 in various ways which will be referred to more fully hereinafter.

Figure 7:
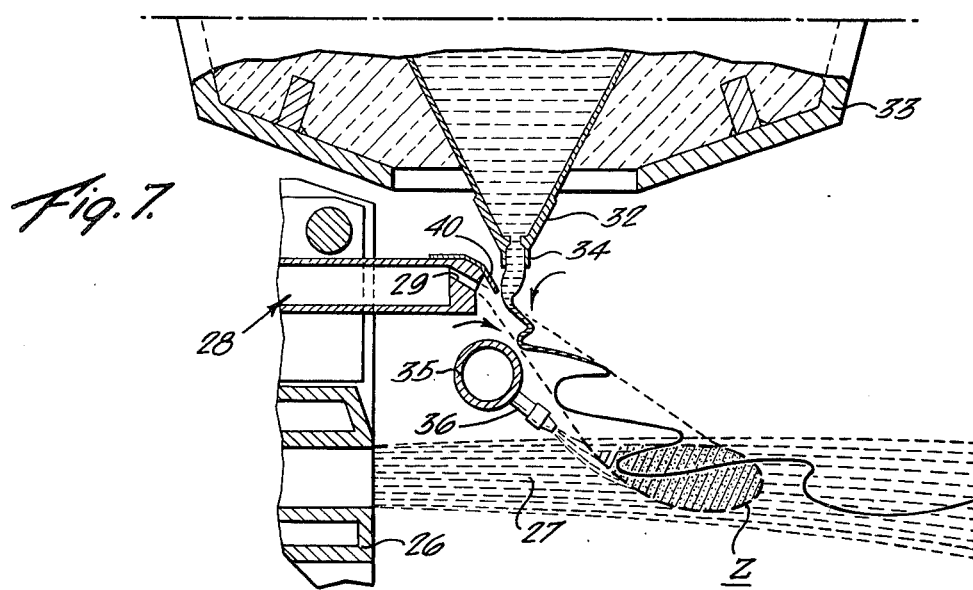
FIG. 7 is a view similar to FIG. 4 but illustrating a modification.
Figure 8:
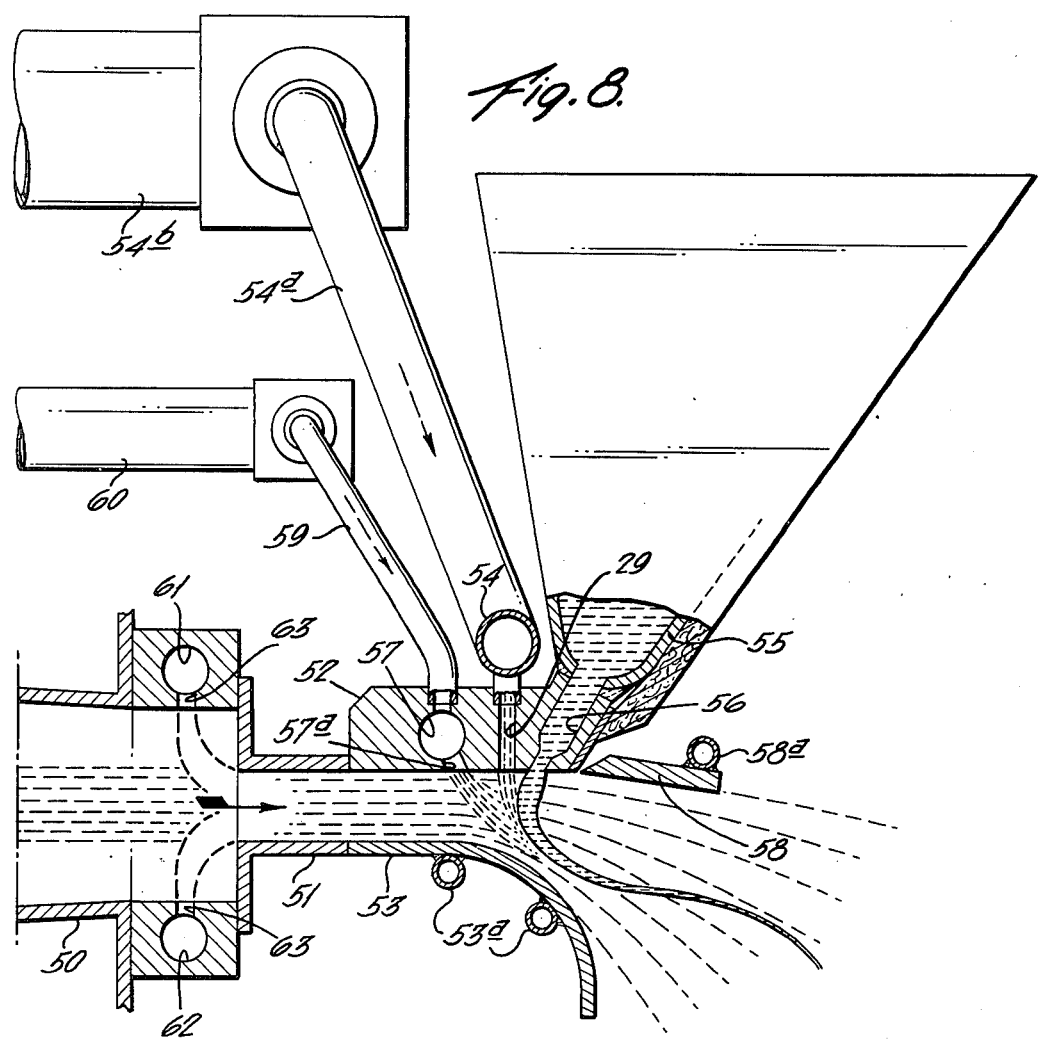

However, attention is first directed to the following structural description of the embodiments of FIGS. 7 and 8.

The arrangement shown in FIG. 7 is much like that which appears in FIG. 4, and similar reference characters have been applied. In FIG. 7, however, a separate means for introducing fuel or comburent components into the zone of interaction is illustrated. Here a supply connection 35 is indicated and a series of spaced delivery nozzles 36 are associated with the supply 35 and are directed into the blast in the region adjoining and immediately upstream of the zone of interaction which is indicated in FIG. 7 at Z.

In FIG. 8 the blast generator is indicated at 50, the blast being delivered through the nozzle 51 into a zone defined at its upper side by a plate structure 52 and at its lower side by a plate structure 53, the latter being curved downwardly away from the mean plane of the blast. If desired this plate may be provided with cooling tubes 53a associated therewith.

The bushing 55 for the glass supply is provided with a series of orifices one of which is indicated at 56, the orifices being spaced from each other transversely of the width of the blast in order to deliver streams of the attenuable material into the blast. Just upstream of the glass delivery orifices, the upper plate 52 is provided with a series of jet orifices 29, one associated and aligned with each one of the glass delivery orifices. The orifices 29 are supplied from a manifold 54 to which the compressed jet fluid is supplied through the connections 54a and 54b.

The plate 52 further is provided with a manifold passage 57 having a series of orifices 57a spaced from each other transversely of the blast and each one associated and aligned with the pairs of glass and jet orifices 56 and 29. This manifold 57 is supplied with a gaseous fuel as by the supply connection indicated at 59 which may be connected with a principal supply 60.

A downstream plate 58 is positioned at the upper boundary of the blast, this plate having a cooling tube 58a. This arrangement is similar to that provided in FIG. 11 of our earlier U.S. Pat. No. 3,885,940.

In the embodiment of FIG. 8 fuel is introduced through the orifices 57a and air is employed for the carrier jets introduced through the orifices 29, thereby providing a mixture of fuel and comburent in the zone of interaction in the blast.

In addition provision is also made in the embodiment of FIG. 8 for the introduction of additional air into the blast upstream of the zone of interaction. For this purpose, upper and lower air supply passages 61 and 62 are provided in a portion of the structure in the region of the connection of the blast generator 50 and the nozzle structure 51, and each of these supply passages is provided with a slot or with a plurality of supply orifices as indicated at 63.

In an embodiment such as shown in FIG. 8, the introduction of air into the blast as just referred to accomplishes certain important purposes related to the energy localization technique. Thus, with the combustion of fuel in the zone of interaction, it is not necessary to use a blast having as high temperature as is required where combustion of fuel is not occurring in the zone of interaction. In view of this special embodiment comprising a burner of the type similar to that shown in FIG. 7 but burning a smaller quantity of fuel, is used to heat the additional air supplied through the passages 61, 62 and 63 in order to obtain a blast at relatively low temperature. The effect of using a blast of lower temperature will appear more fully hereinafter in the analysis given in connection with FIGS. 9a and 9b.

Instead of providing a blast flow of lower temperature in the manner described just above, it is also possible to completely eliminate the use of a blast burner and use as a blast generator some other system of producing a blast having a lower temperature, for instance, by employing a heat exchange device rather than a burner.

Further reference to techniques for introducing the fuel and comburent components into any of the structural arrangements described above, will be pointed out hereinafter, but attention is now directed to the comparative FIGS. 9a and 9b for the purpose of analysis of the energy localization and conservation technique as provided according to the invention.

Figure 9A:
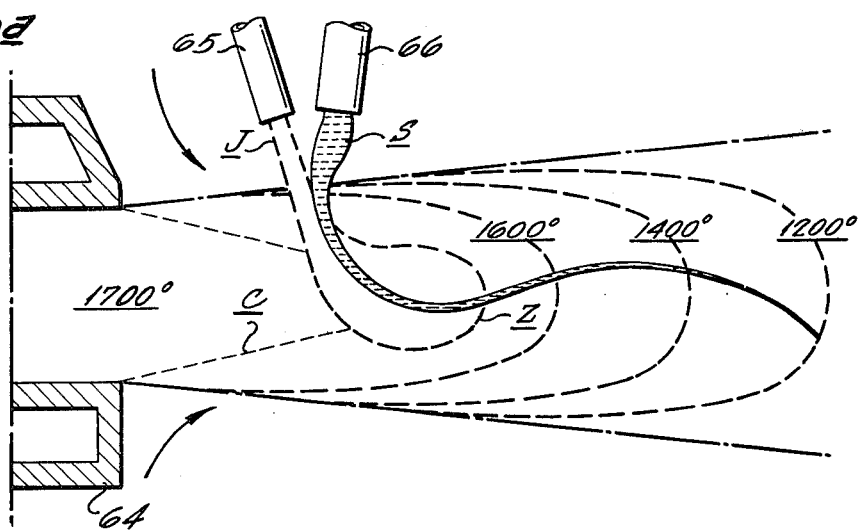
FIGS. 9a and 9b are somewhat diagrammatic sectional views through a fiberizing center, FIG. 9a indicating the action at that fiberizing center, when the energy localization technique of the present invention is not utilized, and FIG. 9b representing the same fiberizing center when the energy localization technique of the present invention is utilized.

As above indicated FIG. 9a represents a typical toration type of fiberization operation without the addition to the system of the energy localization technique of the present invention. In this Figure the blast delivery nozzle is indicated at 64, it being understood that the blast delivered from this nozzle is preferably of substantial width, i.e. substantial dimension in a direction perpendicular to the plane of the Figure, so that a series of pairs of jet and glass supply devices 65 and 66 may be associated with the blast thus provide for the production of a multiplicity of fibers.

In this FIG. (9a) the glass stream is indicated at S and the secondary jet at J, the zone of interaction between the jet and the blast being indicated at Z. With such a system and with a typical glass composition, the temperature of the jet may be of the order of 800° C. (as disclosed in prior U.S. Pat. No. 3,885,940) or the jet may have a temperature closer to ambient (as disclosed in prior application Ser. No. 780,589). In either event according to the techniques of the prior applications and patents referred to the temperature of the blast would be of the order of 1500° to 1750° C., (depending somewhat on the temperature of the jet) in order to provide the desired temperature in the zone of interaction for the purpose of effecting attenuation of the glass stream. In FIG. 9a a temperature of 1700° C. is indicated at the mouth of the blast nozzle and since the core of the blast indicated at C. extends to the zone of interaction of the jet with the blast, the zone in which the attenuation is actually occurring will have a temperature intermediate that of the blast and that of the jet. Downstream of the zone of interaction the isotherm lines are indicated at progressively lower temperatures, for instance 1600° C., 1400° C. and 1200° C.

Figure 9B:
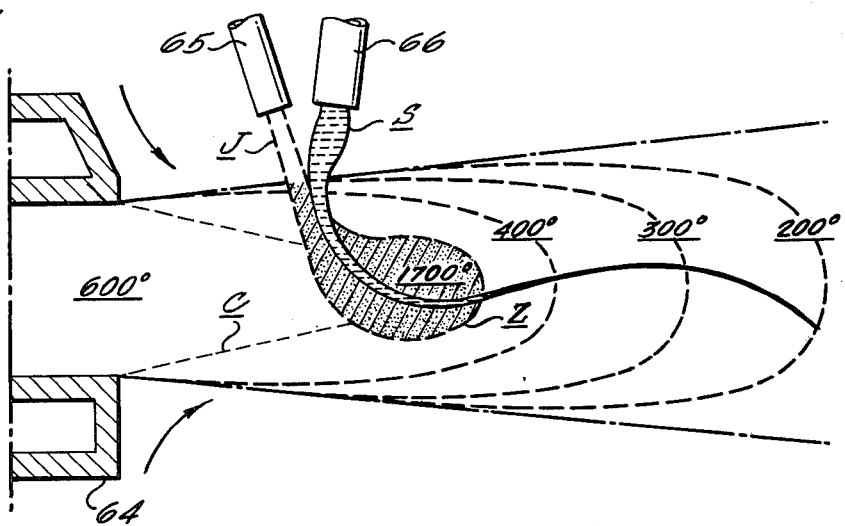

In comparison with the foregoing, in FIG. 9b, exactly the same apparatus components are indicated, but FIG. 9b represents the prevailing conditions where the energy localization technique of the present invention is applied to the same equipment as shown in FIG. 9a. For this purpose, the jet device 65 may be supplied with fuel under pressure, for instance a combustible gas mixture, and additional air or oxygen may be delivered through the blast nozzle 64; and in a typical case the gases of the blast at the point of delivery are contemplated to be at a much lower temperature than when operating as in FIG. 9a. For example the blast temperature may be in the range from about 550° C. to 650° C., for instance of the order of 600° C., as delivered from the blast nozzle 64, and a large proportion of the volume of the gases will of course decrease in temperature as indicated by the isotherm lines, for instance to temperatures of about 400° C., 300° C. and 200° C. in positions downstream of the blast delivery nozzle in zones comparable to the isotherm lines indicating temperatures of 1600° C., 1400° C. and 1200° C. in FIG. 9a.

Although it is possible to introduce the fuel in the blast, it is preferred to introduce the fuel as a portion of a jet, as above described.

Thus, in one embodiment of the technique according FIG. 9b, the jet J not only serves to establish the zone of interaction desired and into which the glass stream S is delivered, but in addition the jet provides a fuel component in the zone of interaction and this fuel component, because of the whirling currents which are characteristic of the zone of interaction is intimately admixed with the comburent, namely the excess of air brought to the zone of interaction by the blast flow.

In considering the ratio of fuel to comburent, it is first pointed out that under theoretically ideal conditions, stoicheometric proportions of fuel and comburent would be employed. However, a combustible mixture may be provided throughout a range varying from the stoicheometric ideal. Thus, in the case of the use of natural gas and air, the quantity of the air may range from about 0.8 to about 1.7 of the quantity of air providing stoicheometric proportions.

With such appropriate quantities of air and fuel, the zone of interaction comprises a combustible mixture, and this mixture in a typical technique according to the invention has an ignition point in a range below temperatures of typical molten glass compositions employed for fiberization, so that the delivery of the glass stream serves not only to introduce the attenuable material into the zone of interaction but also serves to ignite the combustible mixture of the fuel and comburent brought into the zone of interaction respectively by the jet and blast. In consequence the desired temperature, for example 1700° C. may be provided in the zone of interaction in order to provide for attenuation of the glass stream to form the fiber, the zone Z in FIG. 9b being indicated as being at 1700° C., notwithstanding the fact that the blast temperature both upstream and downstream of the zone of interaction is at a much lower temperature.

It is further to be noted that in the technique as diagrammed in FIG. 9b the zone of interaction provided by each of a series of jets may comprise only a very small portion of the total volume of the blast flow, and since this small volume is the only portion which need be elevated in temperature to the higher value required for attenuation, a very large energy economy is effected, as compared with systems in which the entire volume of the blast is heated to the attenuation temperature.

It should also be noted that the toration fiberizing technique is especially well adapted to the localization of thermal energy because of the formation of a local zone of low pressure and velocity that is formed immediately adjacent to and generally surrounding each glass stream, without the need for the interposition of physical structure. The fuel or comburent can be injected into the zone of interaction to form a combustible mixture and the hot glass is present for ignition of the mixture.

The zone of interaction is characterized by whirling currents or tornadoes of high velocity, and these currents are useful in the energy localization technique of the present invention for the purpose of effecting an intimate admixture of the fuel and comburent. However, in the zone of interaction, since the whirling currents around the tornadoes move in directions upstream of the blast and then in directions downstream of the blast, this necessarily generates zones in which low velocities are present with respect to the blast flow, and this is also of importance in the technique of the present invention in providing a condition in which ignition of the combustible mixture may occur and in which stable combustion may be maintained. The importance of this will be apparent when keeping in mind that with a combustible mixture, formed, for example, of natural gas and air the flame propagation rate is of the order of 0.3 to a few meters per second at 20° C. Although this flame propagation rate rises somewhat with rise in temperature, it is still quite low, as compared with the valocities of the blast. Nevertheless the zone of interaction is also characterized by flow in certain regions at velocities well below the flame propagation rate, in view of which ignition and maintenance of stable combustion may be established. Although it is believed the foregoing represents an explanation of the reasons why ignition and stable combustion may be established in the zone of interaction, it is also possible there may be other reasons why the desired ignition and stable combustion occurs.

As a substantial proportion of the heat necessary to maintain the glass stream in attenuable condition is transferred to the stream by contact of the hot gases with the surface of the glass stream, the technique disclosed results in a very efficient transfer of heat to the glass stream because the gases of the zone where intense heat is developed are in close contact with the surface of the glass stream.

Still further it should be noted that the system as described above in connection with FIG. 9b takes advantage of the natural tendency for the flame to adhere to the source of ignition, which in this system is the glass stream itself, i.e., the stream of material which it is desired to elevate to the appropriate attenuation temperature. This is because the temperature is higher and about twice the ignition temperature of the mixture and because on the surface of the glass stream a boundary layer of combustible mixture develop and is brought to ignition conditions by the heat given off by the glass. In consequence a layer immediately around the glass is ignited and this initiates a localized and stable combustion adhering to the glass stream in the adjacent layers in the zone of interaction.

Still another advantage of the technique of the present invention is the fact that with many glass compositions the strength of fibers produced is increased if the fiber temperature is rapidly reduced after fiberization is completed. Ideal conditions for this purpose are present in the system of the invention, as is readily apparent from FIG. 9b.

Returning to a consideration of the equipment shown in FIGS. 1, 2, and 3 it will now be understood that if desired the pair of jets a—a may comprise the fuel component of the system and thus serve not only to carry the glass into the zone of interaction in the blast but also to introduce the fuel into the zone of interaction, and, as in FIG. 9b, air may be introduced into the system by the blast 10. In this manner, with temperatures such as those referred to in connection with FIG. 9b for the jet and blast, the desired energy localization and fuel conservation may be achieved.

In connection with the embodiment of FIGS. 4, 5 and 6, if desired the entire volume of the fuel component may be introduced with the jet, and air may be introduced with the blast, preferably with reduction of blast temperature to values such as suggested above in connection with FIG. 9b in order to take full advantage of the fuel economies thereby attained.

In each of FIGS. 7 and 8 the fuel component may be introduced separately from the jet, as already described. In FIG. 7 air may be introduced either by means of the jet itself or by the blast, or both. One embodiment of the equipment for introducing air with the blast is shown in FIG. 8, and as there shown the air is added to the blast flow near the discharge nozzle 51. The introduction of the air or comburent component into the blast is desirable because in this way the total volume of gases required for the blast is provided without the necessity for heating the total volume to the elevated temperatures required in the zones of interaction where the fiberization occurs, the advantages of which are explained above with particular reference to FIG. 9b.

Figure 10:
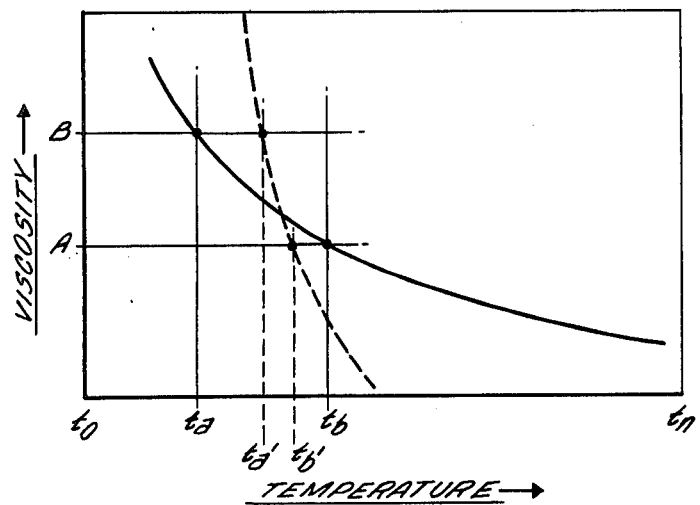
FIG. 10 is a graph illustrating an advantage of the technique of the present invention as applied to the fiberization of certain classes of thermoplastic mineral materials.

The energy localization system of the present invention also has special advantages in the attenuation of certain classes materials, such as certain types of rock and other mineral materials, either natural or synthetic, with which the attenuation temperature range is very narrow. In the graph of FIG. 10 the viscosity and temperature relationships for two different types of attenuable materials are illustrated, one representing glass commonly used for fiberization, and the other representing a naturally occuring rock material having a narrow temperature range in which the viscosity is suitable for fiberization. From the graph it will be seen that the fiberization viscosity lying between points A and B occurs over a much wider temperature range (temperature range $t_a$-$t_b$), for the glass, than for the rock (temperature range $t_a^1$-$t_b^1$).

By introducing fuel in appropriately controlled quantity into the toration or interaction zone in the blast, the appropriate fiberization temperature for the rock or similar materials may be extended somewhat downstream, thereby facilitating maintenance of the desired fiberization viscosity for a longer interval.

In connection with the fiberization systems, such as shown in the embodiments of FIGS. 1 to 3, 4 to 6, and 7, in each of which the stream of attenuable material is introduced into the influence of the jet upstream of the zone in which the jet penetrates the blast, if both fuel and comburent are present in the jet flow at the point to which the stream of attenuable material is delivered, the point of ignition will not necessarily occur at the point of delivery of the stream of attenuable material, and the ignition may therefore not take place until the jet approaches the blast or even enters the blast, depending upon various operating conditions, such as the temperature and velocity of the jet.

The fuel employed desirably comprises natural or synthetic gas, but certain liquid fuels may be used in vaporized or carbureted form.

As illustrating operating conditions which may be used according to the present invention, the following conditions may be employed:

With a fiberizing center of the kind shown in FIGS. 1 to 6, the blast 27 is established by heating and compressing a volume of air and has a temperature of about 600° C., a velocity of about 300 m/s and a pressure of about 0.18 bar. The axes of the two jets intersect at an angle of 60°. One of the two jets comprises a mixture of 1 part in volume of natural gas and 3 parts of air. The other has 4 parts of air volume each jet having a temperature of about 20°, a velocity of about 330 and a pressure of about 2.5 bar. The glass is delivered at a temperature of about 1300° C.

With a fiberizing center of the kind shown in FIG. 7, the same blast comditions as mentioned above may be employed and the jet may have a temperature of 20° C., a velocity of 330 m/s and a pressure of 2.5 bar. In this case natural gas is fed to the device 36 at a pressure of 0.5 bar and a velocity of 900 m/s. The glass is delivered from the device 34 at about 1300° C.

We claim:

1. A method for attenuating thermoplastic mineral material comprising generating a gaseous blast, generating a gaseous jet having a smaller cross sectional dimension than that of the blast in a direction transversely of the blast, the jet having greater kinetic energy per unit of volume than the blast and being directed transversely into the blast thereby developing a zone of interaction having whirling gas currents, and delivering a stream of attenuable material into said zone, characterized in that the gas currents in said zone include fuel and comburent components in proportions providing a combustible mixture, and in that the stream of attenuable material is delivered into said zone at a temperature at least as high as the ignition temperature of said mixture.

2. A method as defined in claim 1 in which the fuel and comburent components are present in said zone in substantially stoichiometric proportions.

3. A method as defined in claim 1 in which at least one of said fuel and comburent components is introduced into said zone as at least a portion of the jet or blast.

4. A method as defined in claim 1 in which one of said components is introduced into said zone as at least a portion of the jet and in which the other of said components is introduced into said zone as at least a portion of the blast.

5. A method as defined in claim 1 in which the fuel is introduced into said zone as at least a portion of the jet and in which the comburent component is introduced into said zone as at least a portion of said blast.

6. A method as defined in claim 1 in which the comburent is introduced into said zone as at least a portion of the jet or blast and in which the fuel component is introduced into said zone by generating a pressurized gaseous fuel jet directed into the blast in the region of said zone.

7. A method as defined in claim 6 in which the fuel jet is directed into the blast in a position upstream of the first mentioned jet.

8. A method as defined in claim 1 in which the fuel component is introduced into said zone by generating a pressurized gaseous fuel jet directed into the blast, upstream of the first mentioned jet and in which the comburent is introduced into the blast as air delivered under pressure into the blast upstream of the fuel jet.

9. A method as defined in claim 1 in which the temperature of the blast in a region upstream of said zone is lower than that of the stream of attenuable material delivered into said zone.

10. A method for attenuating thermoplastic mineral material comprising generating a gaseous blast, generating a gaseous jet having a smaller cross sectional dimension than that of the blast in a direction transversely of the blast, the jet having greater kinetic energy per unit of volume than the blast and being directed transversely into the blast thereby developing a zone of interaction having whirling gas currents, delivering a stream of attenuable material into said zone, the gas currents in said zone including fuel and comburent components in proportions providing a combustible mixture, and igniting said mixture in said zone.

11. A method as defined in claim 10 in which said comburent component is introduced into said zone as at least a portion of the blast and in which the fuel component is introduced into said zone independently of the jet and blast.

12. A method for attenuating a thermoplastic material comprising
generating a gaseous blast,
generating a plurality of gaseous jet flows, each jet flow having a smaller cross sectional dimension than that of the blast in a direction transversely of the blast, each jet flow having a greater kinetic energy per unit of volume than the blast and being directed transversely into the blast, each jet flow thereby developing a zone of interaction in the blast,
delivering a stream of thermoplastic material into each interaction zone,
developing a combustible mixture of fuel and comburent in each of said interaction zones, and
igniting the mixture in each interaction zone.

13. A method as in claim 12 wherein fuel is supplied to each interaction zone by said jet flows.

14. A method as in claim 12 wherein comburent is supplied to each interaction zone by said jet flows.

* * * * *

UNITED STATES PATENT AND TRADEMARK OFFICE
CERTIFICATE OF CORRECTION

PATENT NO. : 4,113,456

DATED : September 12, 1978

INVENTOR(S) : Marcel Levecque, Jean A. Battigelli and Dominique Plantard

It is certified that error appears in the above-identified patent and that said Letters Patent are hereby corrected as shown below:

Column 8, line 12 - change "system" to read --stream--.

Signed and Sealed this

Fourteenth Day of November 1978

[SEAL]

Attest:

RUTH C. MASON
Attesting Officer

DONALD W. BANNER
Commissioner of Patents and Trademarks